(12) United States Patent
Stolte

(10) Patent No.: US 8,672,263 B2
(45) Date of Patent: Mar. 18, 2014

(54) POWER DISTRIBUTION SYSTEM

(75) Inventor: Ralf-Henning Stolte, Hamburg (DE)

(73) Assignee: Airbus Operations GmbH (DE)

( * ) Notice: Subject to any disclaimer, the term of this patent is extended or adjusted under 35 U.S.C. 154(b) by 331 days.

(21) Appl. No.: 13/121,052

(22) PCT Filed: Sep. 23, 2009

(86) PCT No.: PCT/EP2009/062338
§ 371 (c)(1),
(2), (4) Date: May 2, 2011

(87) PCT Pub. No.: WO2010/034750
PCT Pub. Date: Apr. 1, 2010

(65) Prior Publication Data
US 2011/0220759 A1    Sep. 15, 2011

Related U.S. Application Data

(60) Provisional application No. 61/194,447, filed on Sep. 26, 2008.

(30) Foreign Application Priority Data

Sep. 26, 2008 (DE) .......................... 10 2008 048 915

(51) Int. Cl.
*B64D 41/00* (2006.01)
(52) U.S. Cl.
USPC .......................................... 244/58; 290/1 A
(58) Field of Classification Search
USPC ............................................ 290/1 A; 244/58
See application file for complete search history.

(56) References Cited

U.S. PATENT DOCUMENTS

| 2,296,006 | A |   | 9/1942 | Herbert |
|---|---|---|---|---|
| 3,220,283 | A |   | 11/1965 | Ricard |
| 3,485,462 | A |   | 12/1969 | Spence |
| 4,494,372 | A | * | 1/1985 | Cronin .......................... 60/785 |
| 4,503,666 | A | * | 3/1985 | Christoff ........................ 60/785 |

(Continued)

FOREIGN PATENT DOCUMENTS

| DE | 726862 C | 10/1942 |
|---|---|---|
| DE | 861055 C | 12/1952 |

(Continued)

OTHER PUBLICATIONS

Moderne Militarflugzeuge, Paul Eden Soph Moeng, 2003, Bassermann Verlag, ISBN 3-8094/1532-4, Seiten 152,153.

*Primary Examiner* — Joseph Waks
(74) *Attorney, Agent, or Firm* — Lerner, David, Littenberg, Krumholz & Mentlik, LLP

(57) ABSTRACT

A power distribution system for an aircraft having at least one engine includes at least one torque transmission means that is movably held and is connected to at least one shaft of the engine and extends from the shaft of the engine to an interior region of the aircraft fuselage, and at an end pointing away from the engine has at least one interface for introducing a torque. At the interface of the torque transmission means it is possible both to operate mechanical and to start the engine. Consequently in the aircraft it is possible to essentially do without converting mechanical energy to electrical energy and the subsequent use of electrical energy for generating mechanical power. This is particularly favorable in the case of twin-engine commercial aircraft that are used on short hauls.

9 Claims, 4 Drawing Sheets

(56) References Cited

U.S. PATENT DOCUMENTS

Figure 1:
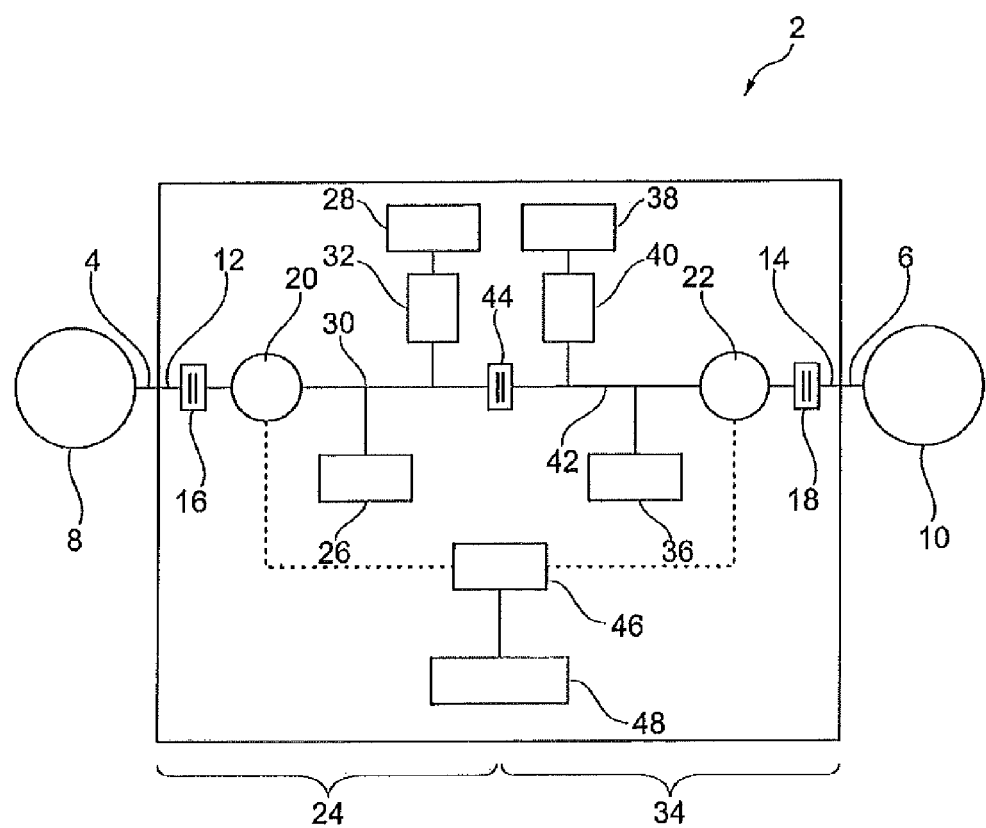

| | | | |
|---|---|---|---|
| 5,054,716 A | 10/1991 | Wilson | |
| 5,143,329 A | 9/1992 | Coffinberry | |
| 5,145,129 A | 9/1992 | Gebhard | |
| 5,271,295 A | 12/1993 | Marnot | |
| 5,285,626 A * | 2/1994 | Leeson | 60/778 |
| 5,490,645 A * | 2/1996 | Woodhouse | 244/118.5 |
| 5,939,800 A * | 8/1999 | Artinian et al. | 307/64 |
| 5,967,461 A * | 10/1999 | Farrington | 244/118.5 |
| 6,283,410 B1 * | 9/2001 | Thompson | 244/59 |
| 6,305,156 B1 * | 10/2001 | Lui | 60/785 |
| 6,931,856 B2 * | 8/2005 | Belokon et al. | 60/772 |
| 7,207,521 B2 * | 4/2007 | Atkey et al. | 244/58 |
| 7,513,119 B2 * | 4/2009 | Zielinski et al. | 60/778 |
| 7,607,318 B2 * | 10/2009 | Lui et al. | 62/402 |
| 7,950,606 B2 * | 5/2011 | Atkey et al. | 244/135 R |
| 8,155,876 B2 * | 4/2012 | White et al. | 701/300 |
| 8,347,647 B2 * | 1/2013 | McAuliffe et al. | 62/401 |
| 2011/0107777 A1 * | 5/2011 | Atkey et al. | 62/115 |

FOREIGN PATENT DOCUMENTS

| | | | | |
|---|---|---|---|---|
| DE | 1108082 B | | 5/1961 | |
| EP | 2033893 A2 | | 3/2009 | |
| FR | 930993 A | | 2/1948 | |
| GB | 1092745 A | | 11/1967 | |
| GB | 2076897 A | * | 12/1981 | F02C 6/06 |
| JP | 09156598 A | * | 6/1997 | |

* cited by examiner

POWER DISTRIBUTION SYSTEM

CROSS-REFERENCE TO RELATED APPLICATIONS

This application is a national phase entry under 35 U.S.C. §371 of International Application No. PCT/EP2009/062338, filed Sep. 23, 2009, published in German, which claims the benefit of the filing date of U.S. Provisional Patent Application No. 61/194,447 filed Sep. 26, 2008 and of German Patent Application No. 10 2008 048 915.8 filed Sep. 26, 2008, the disclosures of which applications are hereby incorporated herein by reference.

The invention relates to a power distribution system for an aircraft that comprises at least one engine, to a method for distributing power in an aircraft, to the use of a power distribution system in an aircraft, as well as to a means of transport, in particular an aircraft, comprising at least one power distribution system.

One object in the development of modern commercial aircraft relates to transmitting power within the aircraft electrically in order to avoid mechanical, hydraulic or other transmission mechanisms that are associated with losses and that lack flexibility. A constant increase in the number of electrical and electronic devices in passenger cabins, as well as the development of environmental control systems, which use little bleed air or completely do without bleed air, with electrical compressor motors and fan motors results in the need to integrate, in aircraft engines, electrical generators with very high electrical outputs.

The dimensioning and the number of generators installed in an aircraft depends on a host of factors. In order to ensure adequate reliability of a commercial aircraft a comprehensive regulatory framework is in existence that provides for mean distance of time between failures ("mean time between failure", MTBF) or similar parameters for aircraft systems with any desired criticality. For example, in the dimensioning of electrical generators of a twin-engine commercial aircraft it is also necessary to comply with the "extended-range twin-engine operation performance standards" (in abbreviated form: ETOPS) issued by the ICAO, by means of which ETOPS twin-engine commercial aircraft can be designed so that they are allowed to be used for extended distances with only one functional engine when the nearest airport is more than 60 minutes away. Among other things resulting from this, in more recent twin-engine commercial aircraft there is a total of four generators—in each case two generators in each of the engines—which generators are in each case able to generate the entire electrical power. Due to the required power of several 100 kW the generators are correspondingly very large, heavy and expensive. However, in relation to possible cases of faults, as a result of multiple redundancies and comprehensive regulatory mechanisms the electrical supply can be considered to be nearly fail-safe.

The electrical power provided by the generators is provided, in the form of direct current and/or alternating current at a constant frequency, by means of elaborate power electronics, which in turn produce large quantities of exhaust heat to be let off. While such expenditure for the associated efficiency increase may be justified in larger long-range aircraft, in the case of smaller aircraft that are predominantly used on short hauls it could not be economically justified.

It is an object of the invention to propose a power distribution system for equipment and devices in an aircraft comprising at least one engine, which power distribution system does not use electricity as the primary means of transmission. It is a further object of the invention to propose such a power distribution system for an aircraft, which power distribution system is suitable for operating an environmental control system of an aircraft as far as possible independently of bleed air.

This object is met by a power distribution system according to the characteristics of the independent claim 1.

An important aspect of the power distribution system according to the invention consists of a torque transmission means transmitting a rotary movement from a shaft of at least one engine to a region of the aircraft interior where this rotary movement can be used to drive different kinds of devices. If the aircraft is a twin-engine aircraft in which the engines are arranged directly on a fuselage aft section, the distances to the aircraft interior, which distances are to be bridged by means of the torque transmission means, are relatively short. Equally it could, however, also be possible, directly between two wings, with each comprising an engine, to provide a region in which the devices are arranged and are driven by the torque transmission means.

Thus it would, for example, be possible to operate devices of an environmental control system of the aircraft, which devices are rotatable directly from the rotation of the torque transmission means. For example, when bleed air is tapped from the engines, the torque transmission means could drive an air cycle machine by means of which cooling of air can take place. To this effect a connection with a lower bleed air pressure on the engines could be selected for removing bleed air because the air cycle machine can additionally generate pressure as a result of its mechanical connection. This results in improved efficiency of the engine. The mechanical power transmitted by the engines would be helpful in particular from commencement of descent, because in this phase the engines are operated at idle. Furthermore, one or several compressors could be driven to pressurise the cabin for replacement of bleed air, which compressors introduce air from an air source to the cabin and/or to a mixing chamber.

Any machine elements that make it possible to transmit torque can be considered to be possible torque transmission means. As one of the simplest examples, a conventional shaft is mentioned which can be expanded by joints in order to move along more complex paths and to compensate for thermal expansion and oscillation movements. Furthermore, it would be possible to use belt drives or chain drives as torque transmission means. In order to compensate for differences in the speed between the rotation of the shaft in the engine and the device to be driven, furthermore, gear arrangements can be used which in a special exemplary embodiment are also designed to provide an output speed that is independent of the input speed. The torque transmission means and the optional gear arrangement need to be supported within the aircraft so that reliable transmission of the torque can be ensured and at the same time the integrity of the torque transmission means can be ensured under all operating conditions.

For the power distribution system according to the invention to be as flexible as possible and for the corresponding devices to be driven only when required, it is preferred if the devices are driven by a distribution shaft that can be coupled, by means of a first coupling, to an interface of the torque transmission means. In addition to this, in some application cases it may be sensible in each case to provide an additional coupling on defined devices to be driven, which coupling makes it possible, when required, to decouple the respective device. As an alternative to this, when considering various operational cases of the aircraft it may be sensible to be able to connect all the devices independently of each other to the torque transmission means; however, this requires a transfer case or several interfaces at the torque transmission gear arrangement.

For example, an end of a corresponding shaft can be considered an interface of a torque transmission means, to which end a shaft-hub connection is affixed or can be affixed. This could be a serration spline, a key-and-groove combination, a flange or the like.

Interruption of the rotation of the devices connected to the torque transmission means can be stopped as required by undoing the corresponding first coupling so that, for example during an engine start, mechanical loads of the starting-up engine can be reduced.

A preferred improvement of the load distribution system according to the invention provides for the integration of at least one motor-generator unit that can be coupled to the torque transmission means. This motor-generator unit can preferably be operated as a motor or as a generator with variable or constant frequency or as a direct-current generator so that during generator operation electrical energy is generated from the rotation of the torque transmission means, or during motor operation the associated engine can be started. When the aircraft is situated on the ground, in this way ventilation of the cabin, cooling by means of an air cycle machine, or an evaporative cooling circuit can be implemented. When the associated engine is in operation, the electrical energy obtained in generator operation can be used for supplying electrical or electronic loads whose power supply is not possible by mechanical means or is possible only with difficulty, as is, for example, the case with purely electronic arithmetic units with conventional electronic semiconductor devices.

According to a further aspect of the power distribution system according to the invention, torque can be transmitted with the use of several torque transmission means for several engines, for example between a left-hand drive train and a right-hand drive train which in each case is associated with a left-hand or a right-hand engine and in each case comprises a torque transmission means, rotatable devices and any couplings. This is particularly sensible should an engine have failed and not all the devices to be driven can be driven by the remaining drive train of the engine which is intact. The drive train on the failed engine could, for example, be decoupled by undoing the associated first coupling from the engine, and could take up torque from the adjacent drive train. To this effect it would be sensible to arrange a second coupling between the two drive trains, by means of which second coupling transmission of torque from one drive train to the other drive train is made possible. This means that in the case of a fault the power distribution system according to the invention can be reconfigured to take into account failures in parts of the system.

According to a further aspect of the invention, as an alternative, power distribution could also take place without operation of the engines if the aircraft is, for example, situated on the ground and operation of the engines at idle would be economically unfavourable. In this situation one or several motor-generator units, decoupled from the engines by undoing the first couplings, could be made to rotate, supplied by way of an internal or external current source. This makes it possible to provide a mechanical supply of power to compressors, air cycle machines or evaporative cooling machines of an environmental control system, as well as to provide electrical supply to electrical loads. In smaller commercial aircraft a combustion engine could be considered to provide adequate electrical power; however, a fuel cell, an arrangement comprising several fuel cells, one or several accumulator batteries, an external power supply or the like—wherein this listing does not claim to be complete—would also be imaginable and advantageous.

Further advantageous improvements of the power distribution system according to the invention are provided in the subordinate claims. Furthermore, the object is met by a method for power distribution in an aircraft, by the use of a power distribution system according to the invention, and by a means of transport, in particular an aircraft, comprising at least one power distribution system according to the further independent claims.

Figure 2:
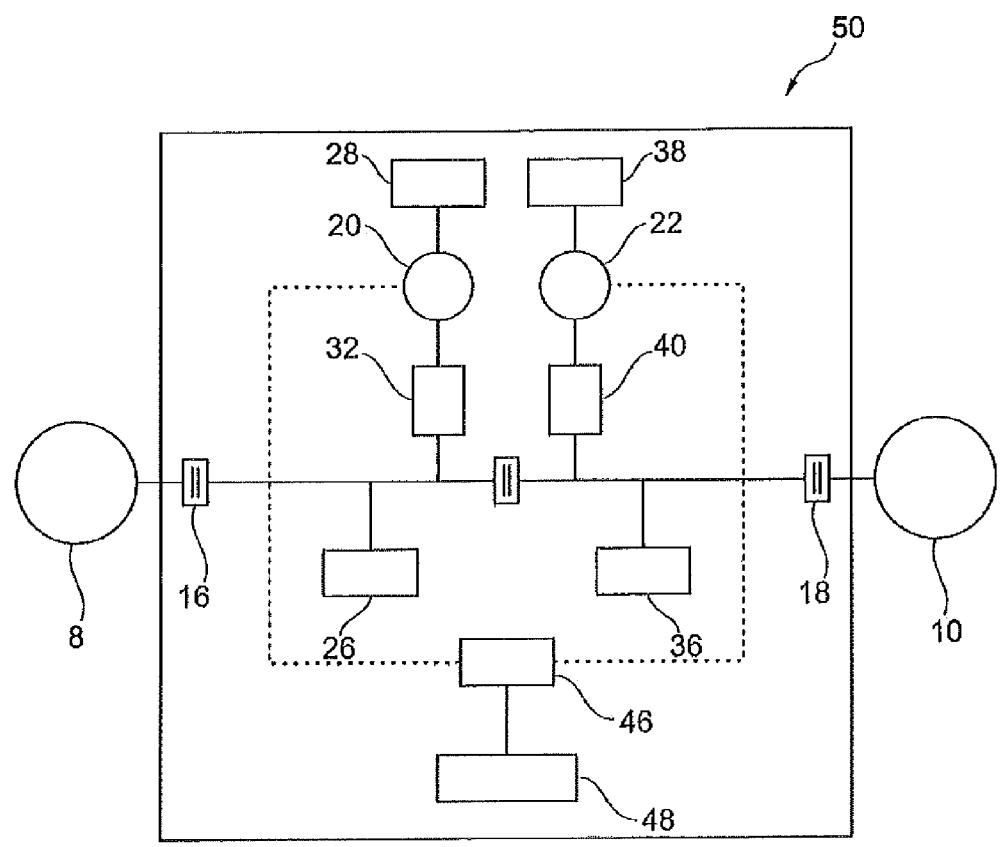
Figure 3:
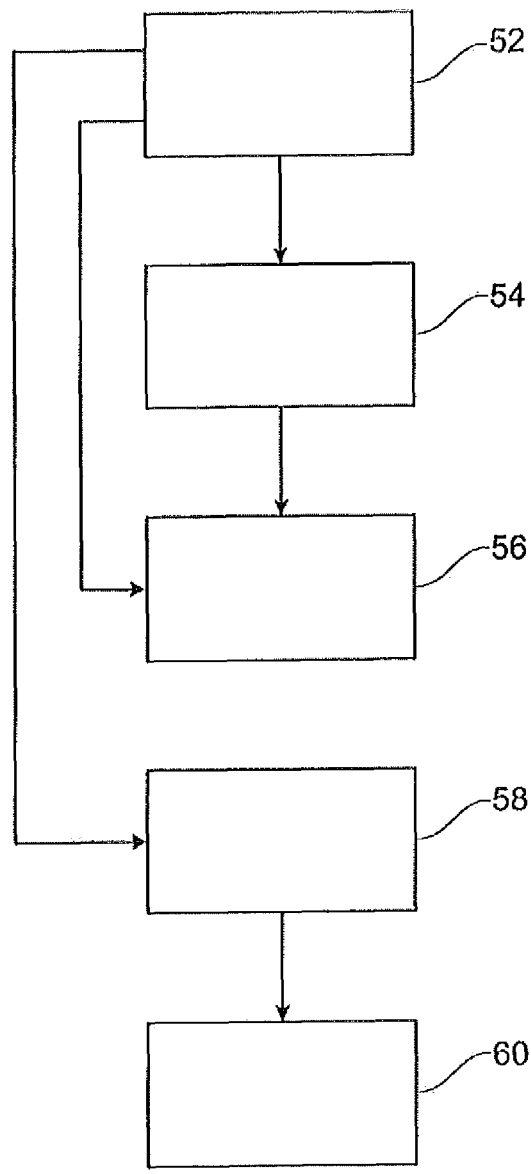

Further characteristics, advantages and application options of the present invention are disclosed in the following description of the exemplary embodiments and of the figures. All the described and/or illustrated characteristics per se and in any combination form the subject of the invention, even irrespective of their composition in individual claims or their interrelationships. Furthermore, identical or similar components in the figures have the same reference characters. The following are shown:

FIG. 1: a diagrammatic view of a first exemplary embodiment of the power distribution system according to the invention;

FIG. 2: a diagrammatic view of a further exemplary embodiment of the power distribution system according to the invention;

FIG. 3: a method for the distribution of power in an aircraft; and

Figure 4:
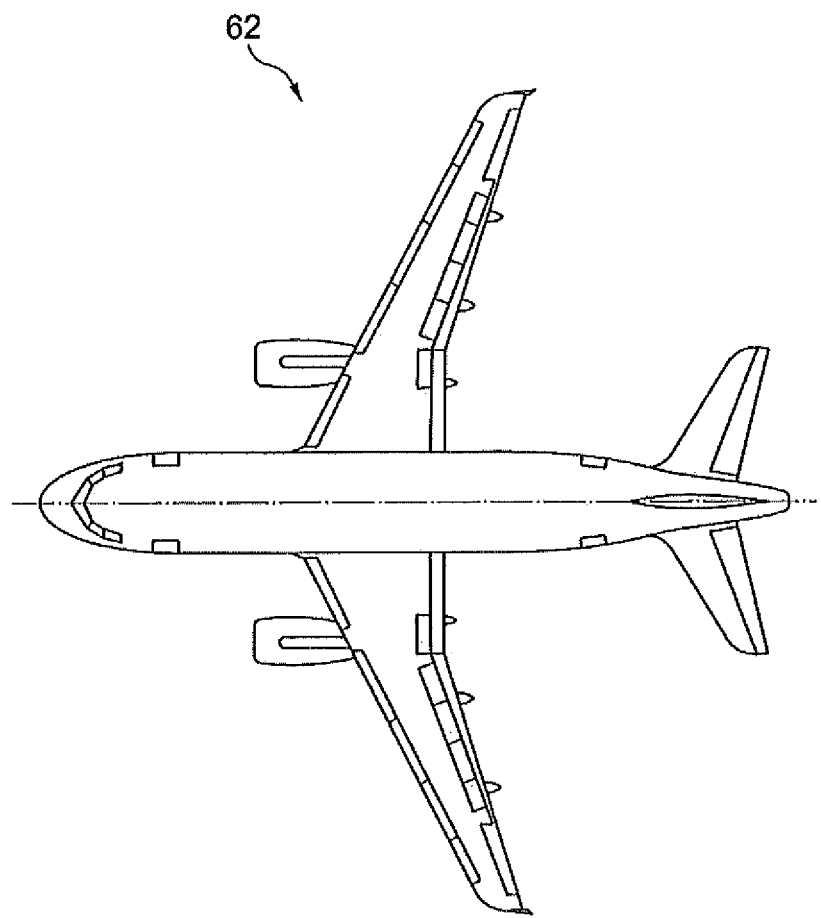

FIG. 4: an aircraft comprising at least one power distribution system according to the invention.

FIG. 1 shows a power distribution system 2 according to the invention, which power distribution system 2 is preferably installed in the interior of an aircraft fuselage. The power distribution system 2 essentially comprises two torque transmission means 4 and 6, which from a left-hand engine 8 and a right-hand engine 10 transmit torque into the aircraft fuselage. At their ends the torque transmission means 4 and 6 in each case comprise a kind of interface 12 and 14 at which the torque transmitted into the aircraft fuselage can be tapped.

In the example shown, two first couplings 16 and 18, which normally are preferably closed, follow on from the interfaces 12 and 14 and can optionally exchange torque between the left-hand engine 8 and a left-hand motor-generator unit 20, or between the right-hand engine 10 and a right-hand motor-generator unit 22. The motor-generator units are directly connected to the torque transmission means 4 and 6. In the left-hand drive train 24 several loads 26 and 28 follow which can use a torque provided in the left-hand drive train. The load 28 is, for example, not directly operated by a distribution shaft 30 following on from the motor-generator unit 20, but instead by way of an interposed gear arrangement 32. In the right-hand drive train 34, in which the torque of the engine 10 is transmitted, several loads 36 and 38 are also arranged, wherein the load/s 38 is/are driven as well, by way of an interposed gear arrangement 40, by a distribution shaft 42 that is arranged downstream of the motor-generator unit 22.

In the exemplary embodiment shown in FIG. 1 the left-hand drive train 24 is coupled to the right-hand drive train 34 by way of a second coupling 44 so that in the event of a failure of an engine 8 or 10 torque can be transmitted to the loads 26, 28 or 36 and 38 if the corresponding drive train is not driven by the associated engine 8 or 10. Furthermore, the power distribution system 2 according to the invention comprises an electronics unit 46 that is electrically connected to the motor-generator units 20 and 22. Likewise, an auxiliary power source 48 is coupled to the electronics unit 46 and is used to supply the motor-generator units 20 and 22 with a conditioned alternating voltage or direct voltage and to drive or control the aforesaid in engine operation. This could be advantageous if the engines 8 and 10 are not operated, for example with the aircraft on the ground, while nevertheless the loads 26 and 28 or 36 and 38 need to be operated. To this effect the first couplings 16 and 18 to the engines 8 and 10 need to be undone so that the engines 8 and 10 are not unnecessarily made to rotated by the motor-generator units 20 and 22. With the aircraft in flight, this energy source 48 could provide additional redundancy relating to possible faults of the first couplings 16 and 18.

With the engines 8 and 10 running, the motor-generator units generate electrical power which by means of the electronics unit 46 is provided to an existing power supply network or an alternative supply network so that electrical and electronic loads can be operated in addition. This could obviate the need to integrate generators in the engines 8 and 10.

A number of devices and equipment can be considered as suitable loads for the power distribution system according to the invention. For example, to the greatest extent possible without removing bleed air, cabin air compressors could be used for supplying the cabin with fresh air and for pressurising the cabin. Moreover, in relation to each drive train 24 and 34 it is sensible, for reasons connected with redundancy, to use two cabin air compressors. As an alternative to this, with corresponding reliability of the cabin air compressors that can be used, it would also be possible to operate only one such compressor for each drive train 24 and 34. In this case, either an evaporative cooling machine with the coolant 134a or $CO_2$ could be used for cooling, which air conditioner could also be driven by the torque present in the respective drive train 24 or 34. As an alternative to this, the use of an air cycle cooling machine might be sensible, which air cycle cooling machine supports pressurisation of the cabin or could provide pressurisation entirely, and also provides corresponding cooling. If bleed air removal from the engines 8 and 10 is desired, air cycle cooling machines for cooling air and for pressurising the cabin are particularly suitable.

In the illustration shown, the cabin air compressors or the air cycle cooling machines are driven by way of the gear arrangements 32 and 40 due to the high speed of the torque transmission means 4 and 6. In principle it would be feasible for any cabin air compressors that may be used to be driven directly by the torque transmission means 4 and 6 and to design said cabin air compressors with variable geometry. However, this depends on the pressure ratio of input pressure to output pressure of the cabin air compressors, which pressure ratio is to be provided, so that in the case of unfavourable pressure ratios the use of variable geometry may possibly not be sufficient. However, variable geometry of cabin air compressors could nevertheless be provided as an additional option to operation by way of the gear arrangements 32 and 40.

Likewise, additional ventilation fans, hydraulic pumps, cooling fans and the like could be operated directly by way of the shafts 30 and 42 at full rotational speed. If in the aircraft concerned bleed air is removed from the engines 8 and 10, it is imaginable to use said bleed air by means of air cycle machines that are operated on one or several of the gear arrangements 32 and 40.

If the right-hand drive train 34 is operated by the engine 8, the second coupling 44 is closed and the right-hand first coupling 18 is opened. If the left-hand drive train 24 is operated by the engine 10, likewise the middle coupling 44 is closed and the left-hand first coupling 16 is opened.

FIG. 2 shows a modification in the form of a power distribution system 50 in which the position of the motor-generator units 20 and 22 has been changed. They are now located between the gear arrangements 32 and 40 and the associated loads 28 and 38. This means that the motor-generator units 20 and 22 are also operated at a matching reduced speed which differs from the necessary speeds of the loads 26 and 36. The remaining characteristics of the power distribution system 50 correspond to those shown in FIG. 1, so that the motor-generator units 20 and 22 can also obtain electrical power from an electronics unit 46 that has been supplied by an auxiliary power source.

FIG. 3 diagrammatically shows a method according to the invention for distributing power. The method according to the invention essentially comprises the transmission 52 of torque between an engine and at least one rotatable device in the interior of the aircraft by means of a torque transmission means. The method according to the invention especially comprises operating 54 at least one rotatable device of an environmental control system in the form of a cabin air compressor, of an air cycle machine and/or of an evaporative cooling machine, and the transmission 56 of torque between the engine and at least one motor-generator unit, which transmission can also be carried out independently of operation of the rotatable device of the environmental control system. Furthermore, a drive train supplied by a single engine can be separated 58, and a second coupling for transmitting torque from another drive train can be switched 60, as already described above. All the method-related steps can be interchanged in any desired combination and are reversible.

Finally, FIG. 4 shows an aircraft 62 comprising at least one power distribution system according to the invention. It should be pointed out that the power distribution system according to the invention can also, in particular, be used in aircraft comprising engines that are arranged in the region of the fuselage aft section so that only a short distance to the interior of the fuselage needs to be bridged.

The examples provided are only intended to clarify the correlations according to the invention and are not to be interpreted as limitations of the invention or of the scope of protection. Instead, the principle according to the invention can also be applied to aircraft comprising more than one engine or two engines, without having to forego the advantages provided.

In addition, it should be pointed out that "comprising" does not exclude other elements or steps, and "a" or "one" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

LIST OF REFERENCE CHARACTERS

2 Power distribution system
4 Torque transmission means
6 Torque transmission means
8 Engine
10 Engine
12 Interface
14 Interface
16 First coupling
18 First coupling
20 Motor-generator unit
22 Motor-generator unit
24 Left-hand drive train
26 Load 28 Load
30 Distribution shaft
32 Gear arrangement
34 Right-hand drive train
36 Load
38 Load
40 Gear arrangement
42 Distribution shaft
44 Second coupling
46 Electronics unit
48 Auxiliary power source
50 Power distribution system
52 Transmission of torque
54 Operation of a rotatable device
56 Transmission of torque between motor-generator unit and engine
58 Separation of a drive train from an engine
60 Switching of a second coupling
62 Aircraft

The invention claimed is:

1. A power distribution system for an aircraft equipped with at least one engine, comprising:
    at least one torque transmission means;
    at least one distribution shaft;
    at least one first coupling for transmitting a torque between the at least one torque transmission means and the at least one distribution shaft;
    at least one rotatable device of an environmental control system, the at least one rotatable device located in an interior region of the aircraft fuselage and being coupled with the at least one distribution shaft; and
    at least one electrical energy source for operating the at least one rotatable device of the environmental control system and electrical loads of the aircraft when the at least one engine is at a standstill;
    wherein the at least one torque transmission means is movably held and is connected to at least one shaft of the at least one engine,
    wherein the at least one torque transmission means extends from the at least one shaft of the at least one engine to the interior region of the aircraft fuselage, and
    wherein, at an end pointing away from the at least one engine, the at least one torque transmission means comprises at least one interface for introducing a torque into the at least one rotatable device.

2. The power distribution system of claim 1, further comprising at least one motor-generator unit coupled to the at least one distribution shaft.

3. The power distribution system of claim 2, wherein the at least one motor-generator unit is configured to start the at least one engine.

4. The power distribution system of claim 2, wherein the at least one motor-generator unit is configured to provide electrical energy.

5. The power distribution system of claim 1, wherein at least one gear arrangement is arranged between the at least one distribution shaft and the at least one rotatable device of the environmental control system.

6. The power distribution system of claim 1, wherein the aircraft comprises two or more engines and a left-hand torque transmission means and a right-hand torque transmission means,
    wherein the left-hand torque transmission means is connected to at least one left-hand engine and to at least one left-hand rotatable device of the environmental control system;
    wherein at least one left-hand motor-generator unit forms a left-hand power distribution train,
    wherein the right-hand torque transmission means is connected to at least one right-hand engine and to at least one right-hand rotatable device of the environmental control system;
    wherein at least one right-hand motor-generator unit forms a right-hand power distribution train.

7. The power distribution system of claim 6, further comprising at least one second coupling for transmitting torque between the left-hand power distribution train and the right-hand power distribution train.

8. A method for distributing power in an aircraft, comprising:
    transmitting torque between at least one engine of the aircraft and a rotatable device of an environmental control system, the rotatable device located in an interior region of the aircraft fuselage,
    wherein at least one electrical energy source supplies the rotatable device of the environmental control system and electrical loads of the aircraft when the at least one engine is at a standstill.

9. An aircraft comprising at least one engine and at least one power distribution system, the at least one power distribution system comprising:
    at least one torque transmission means;
    at least one distribution shaft;
    at least one first coupling for transmitting a torque between the at least one torque transmission means and the at least one distribution shaft;
    at least one rotatable device of an environmental control system, the at least one rotatable device located in an interior region of the aircraft fuselage and being coupled with the at least one distribution shaft; and
    at least one electrical energy source for operating the at least one rotatable device of the environmental control system and electrical loads of the aircraft when the at least one engine is at a standstill;
    wherein the at least one torque transmission means is movably held and is connected to at least one shaft of the at least one engine,
    wherein the at least one torque transmission means extends from the shaft of the at least one engine to the interior region of the aircraft fuselage, and
    wherein, at an end pointing away from the at least one engine, the at least one torque transmission means comprises at least one interface for introducing a torque into the at least one rotatable device.

* * * * *